Jan. 1, 1935.  C. R. KOURSH  1,986,442
FREEWHEELING MECHANISM
Filed July 15, 1931  2 Sheets-Sheet 1

Inventor
Charles R. Koursh

Witness
Paul J. Gathmann

Jan. 1, 1935.    C. R. KOURSH    1,986,442
FREEWHEELING MECHANISM
Filed July 15, 1931    2 Sheets-Sheet 2

Witness:
Paul J. Gathmann

Inventor:
Charles R. Koursh

Patented Jan. 1, 1935

1,986,442

UNITED STATES PATENT OFFICE 1,986,442

FREEWHEELING MECHANISM

Charles R. Koursh, Chicago, Ill.

Application July 15, 1931, Serial No. 550,921

9 Claims. (Cl. 192—48)

This invention relates to improvements in free wheeling mechanism.

One object of the invention is to provide a relatively simple mechanism which is adapted to operate the clutch for effecting the free wheeling or coasting action and which mechanism, preferably, constitutes a part of the clutch unit.

Another object of the invention is to provide a free wheeling mechanism which can readily be moved by manual means to inoperative or operative position by the driver regardless of the speed at which the vehicle may be traveling, which manual means also permits the adjustment of the mechanism whereby the free wheeling action becomes effective at a greater or lesser over-run of the vehicle speed with reference to the engine speed as the driver may desire.

Other objects relate to various features of construction and arrangement of parts which will be apparent from a consideration of the following specification and accompanying drawings, wherein.

Figure 1:
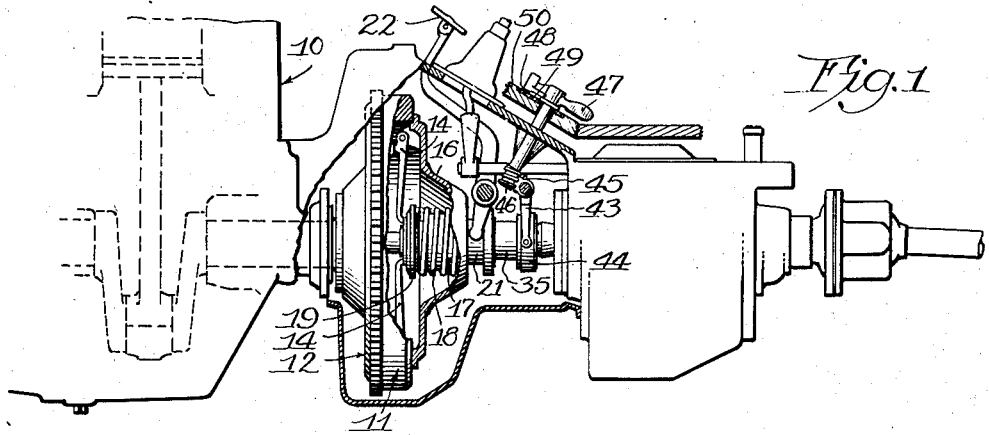
Fig. 1 is a broken elevation illustrating a motor, transmission and one form of clutch mechanism and its related parts incorporated in which are the present improvements.
Figure 2:
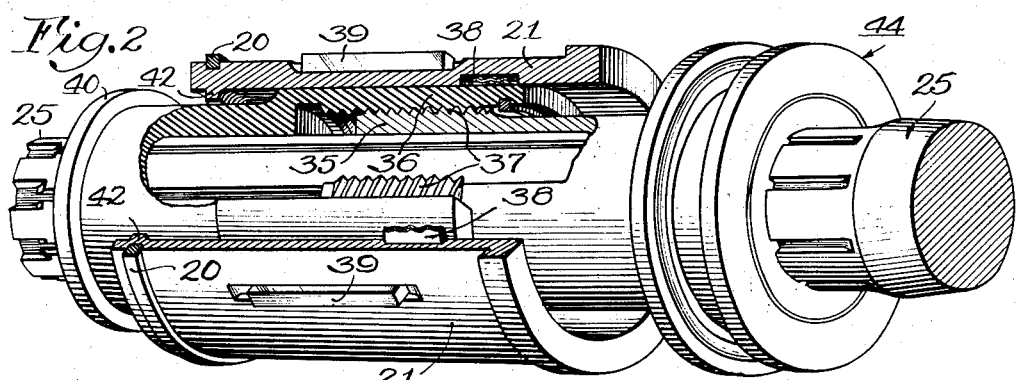
Fig. 2 is a detached broken perspective view of a clutch shaft and associated parts embodying the present invention.

In the drawings the invention is shown embodied in a form of commercial clutch at present in use in many makes of motor cars but it will be apparent that the improvements are adapted for use in conjunction with other conventional clutches also.

Figures 3, 6:
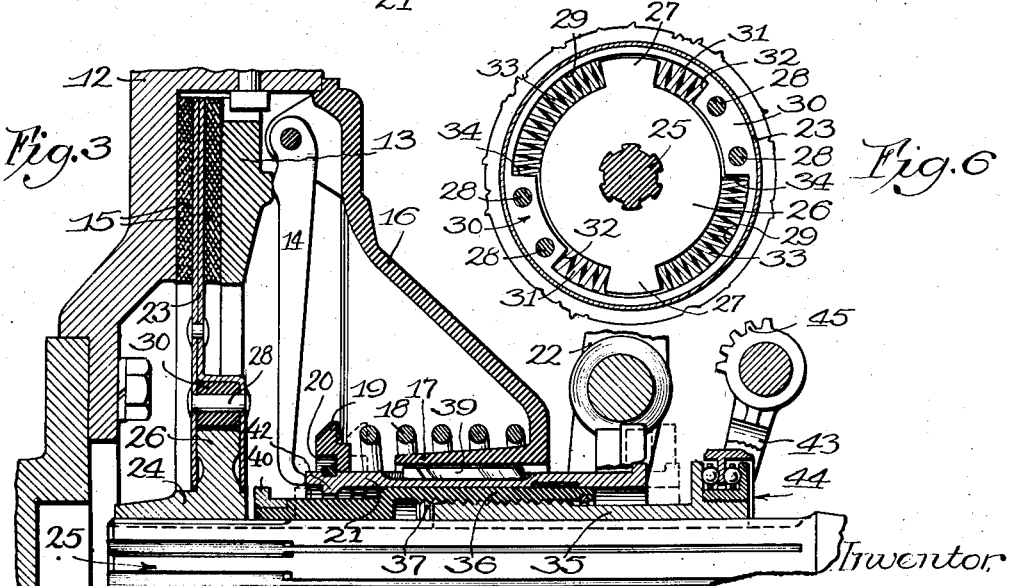
Fig. 3 is a vertical section of a clutch embodying the present improvements shown moved to the extreme inoperative position by the manual adjusting means.
Fig. 6 is a detail of a vibration insulating mechanism of a form substantially as employed in many conventional clutches which permits limited relative movement of the clutch shaft and its friction discs.
Figure 4:
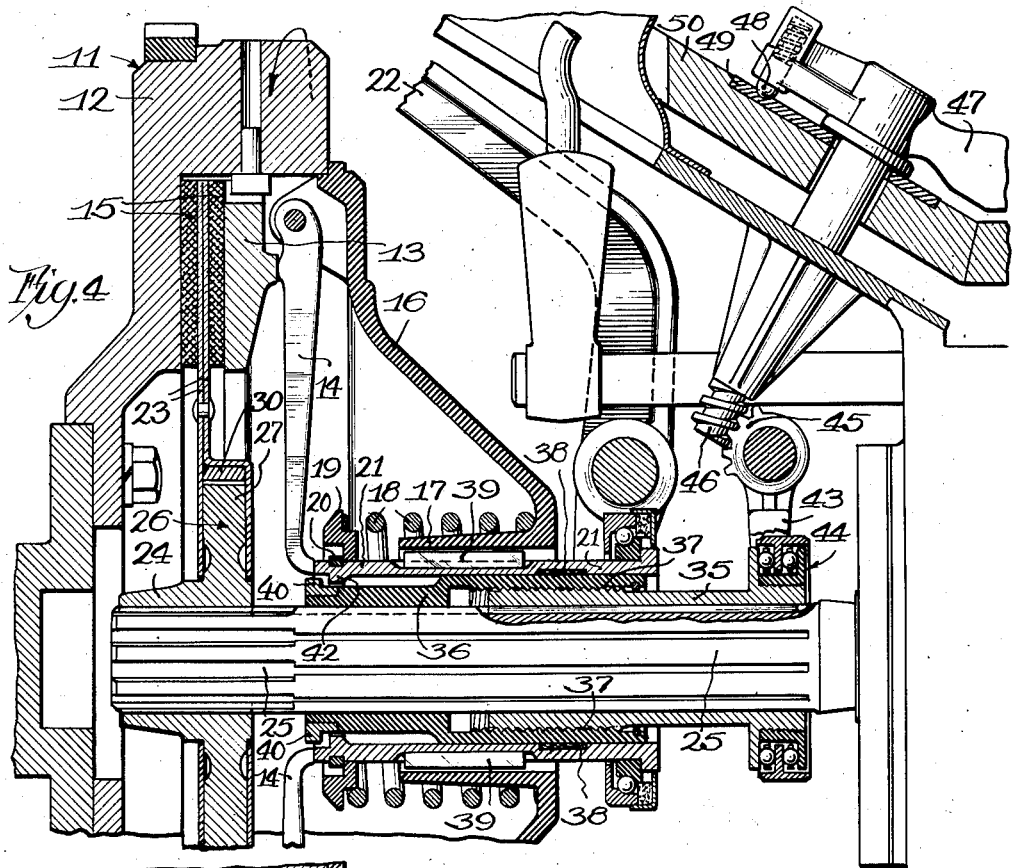
Fig. 4 is a similar view in which the free wheeling mechanism is in normal position, that is, in position to be actuated by the overrunning of the vehicle with respect to the engine to render the free wheeling mechanism effective to automatically disconnect the clutch.
Figure 5:
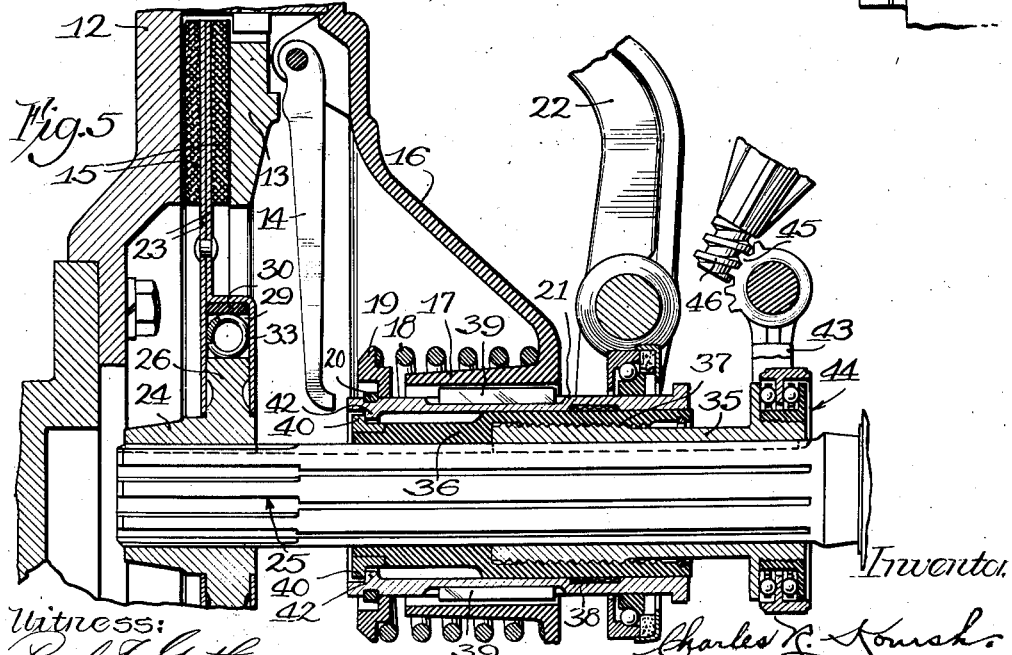
Fig. 5 illustrates the mechanism in operative free wheeling position.

In Fig. 1 an engine 10 is shown provided with a clutch which is indicated generally by the numeral 11. As shown in Figs. 3 to 5 the clutch comprises a fly wheel or driving member 12 which carries a compression plate 13 which is adapted to be pressed by arms 14 against the friction discs 15. The arms 14 are pivoted to the cover or housing 16 which has a flange or hub 17 upon which is positioned a spring 18 which bears at its outer end against a collar 19 and by means of a locking ring 20 forces the sleeve 21 against the arms 14 to effect the compression of the plate 13 against the disc 15. The sleeve 21 can be moved to the right, as shown in Fig. 4, against the spring 18 by the conventional clutch pedal 22 for disengaging the clutch.

The clutch friction discs 15 are mounted on the plates 23 which are carried on the hub 24 which is splined to the end of the clutch shaft 25. Between the spaced apart portions of the plates 23 is the conventional vibration absorbing mechanism somewhat modified and shown in detail in Fig. 6. The hub 24 has a peripheral flange or plate 26 having spring abutments 27 which project into recesses 29 formed in a ring 30 which is riveted to the plates 23, at 28. Springs 31 are positioned between one face of each abutment 27 and adjacent abutment 32 while springs 33 are positioned between the abutments 34 of the ring 30 and the other faces of abutments 27. The springs thus tend to hold the abutments 27 in the position shown in Fig. 6, but upon the initial transmission of power through the clutch discs to the shaft 25, the springs 31 will be fully compressed whereupon the positive driving action of the shaft is effected.

Should the speed of the vehicle be such that the shaft 25 tends to overrun the engine speed, the abutments 27 will move away from abutments 32 and compress the springs 33 against abutments 34. This relative movement of the members 26 and 30 is made use of for actuating means for effecting the disengagement of the clutch to procure the free wheeling action.

The shaft 25 has splined thereto an inner sleeve 35. A second sleeve 36 has threaded engagement with the sleeve 35 as indicated at 37. The sleeve 36 is not splined to the shaft 25 but has frictional engagement with the sleeve 21, preferably by means of a friction ring 38 carried by one or the other. The sleeve 21 is splined or keyed in the conventional manner, (so as to permit free longitudinal movement) as at 39 to the hub or flange 17 of the cover 16.

Referring to Fig. 4 it will be seen that if the shaft 25 should tend to rotate faster than engine speed, as when the driver removes his foot from the accelerator while the car is in motion, and in gear, the limited relative rotation of the shaft 25 with respect to the members 12 or 23 (permitted by the vibration absorbing mechanism above described) the sleeve 35 will then rotate faster than the sleeve 21 which always rotates at engine speed. The frictional engagement of the sleeve 21 and sleeve 36 tends to effect the rotation of the latter also at engine speed. Thus the rotation of the sleeve 35 relative to sleeve 36 causes the latter to move to the right, as shown in Fig. 4, due to the left hand threads 37. The sleeve 36 has a flange 40 at the outer end which engages the flange 42 of the sleeve 21 and moves the latter to the right against the action of the spring 18, thus freeing the arms 14 and releasing the clutch and providing free wheeling or coasting action, as indicated in Fig. 5.

The sleeve 35 is held against longitudinal movement by the shifting fork 43 which is secured to the thrust bearing 44. The fork 43 has a gear 45 which meshes with worm 46 which can be rotated manually by a handle 47 having a spring pressed plunger 48 which bears against a notched plate 49 secured to the floor 50 of the vehicle. By shifting the handle 47, worm 46 rotates the gear 45, and thus the fork 43 will be moved to shift the sleeves 35 and 36 longitudinally of the shaft 25. The sleeves can thus be moved to extreme projected position shown in Fig. 3, in which position the relative rotation of the sleeves 35 and 36 permitted by the described vibration absorbing device, is insufficient to effect the movement of the sleeve 36 far enough to the right to cause the disengagement of the clutch. As there are no rotating gears to be meshed, the free wheeling mechanism can be moved to inoperative position at any time regardless of the speed of the vehicle.

By rotating the handle 47 in the opposite direction, the sleeves can be moved to the right and the free wheeling action thus obtained manually if desired.

By varying the rotative position of the handle 47, the sleeves 35 and 36 can be so positioned longitudinally of the shaft 25 that free wheeling becomes effective as desired, that is upon only a slight overrunning of engine speed, upon the maximum overrunning, or at intermediate degrees of overrunning.

Assuming that the free wheeling mechanism is in operation, due to the speed of shaft 25 exceeding the speed of the engine rotation, the mechanism will be returned automatically to inoperative position upon the appropriate increase in engine speed. When the engine speed increases, as assumed, the sleeve 21 will rotate the sleeve 36 faster than the sleeve 35 is rotating, whereupon the sleeve 36 will move to the left, due to its threaded connection with sleeve 35, and permit sleeve 21 to move to the left also under the action of the spring 18 and press the clutch arms 14 to clutching relation with the plate 13.

What I claim is:

1. The combination with a clutch comprising a driving member, a driven member comprising a clutch shaft, means carried by said shaft for permitting limited rotation of the same relatively to said driving member while said clutch is engaged, means comprising a sleeve slidable along said shaft for controlling the engagement of said driving and driven members, and automatic means operable by said shaft for actuating said sleeve for effecting the disengagement of said driving and driven members upon rotation of said shaft relatively to said clutch driving member, said automatic means comprising a pair of co-acting threaded sleeves on said shaft, one of said sleeves being rotatable with said shaft and the other having frictional engagement with said first mentioned sleeve.

2. The combination with a clutch comprising a driving member, a driven member comprising a clutch shaft, means for controlling the engagement of said clutch members comprising a rotatable sleeve driven by said driving member at engine speed, and free wheeling mechanism carried by said shaft operable by movement of said driven member relatively to said driving member for actuating said sleeve to clutch disengaging position for actuating said mechanism by said sleeve to release the latter from clutch disengaging position upon rotation of said sleeve at a speed greater than said shaft.

3. In combination, a driving member, a driven member, a slidable member for effecting driving engagement between said driving and driven members, threaded means actuated by the overrunning of said driven member for moving said slidable member in a direction to effect the disengagement of said driving and driven members, and operating means between said sliding member and said threaded means for actuating the latter in a direction for effecting the release of said sliding member from said threaded means upon the overrunning of said driving member.

4. In combination, a clutch comprising a driving member, a driven member comprising a clutch shaft, means affording limited rotation of said shaft, relatively to said driving member during the engagement of the clutch, a slidable sleeve around said shaft operable to control the engagement of said driving and driven members and being rotated by said driving member, an externally threaded sleeve splined to said shaft, a third sleeve on said shaft threadedly engaging said second mentioned sleeve, and friction means between said first and third sleeves, said third sleeve having means for engaging said first sleeve for moving the latter in a direction to release said clutch upon the overrunning of said shaft.

5. In combination, an automobile clutch comprising a driving member, a driven member having a shaft, means permitting limited overrunning of each said shaft and driving member with reference to the other, a slidable sleeve for effecting the engagement and disengagement of said clutch, and free wheeling mechanism comprising means slidable along said shaft for actuating said sleeve in a direction to effect the disengagement of said clutch upon the overrunning of said shaft and for releasing said sleeve upon the overrunning of said driving member.

6. In combination, an automobile clutch comprising a driving member, a driven member having a shaft, means permitting limited overrunning of each said shaft and driving member with reference to the other while the clutch is engaged, a slidable sleeve for effecting the engagement and disengagement of said clutch, free wheeling mechanism comprising means slidable along said shaft for actuating said sleeve in a direction to effect the disengagement of said clutch upon the overrunning of said shaft and for releasing said sleeve upon the overrunning of said driving member, and manually operable means for sliding said mechanism out of operative position.

7. In combination, an automobile clutch comprising a driving member, a driven member having a shaft, means permitting limited overrunning of each said shaft and driving member with reference to the other while the clutch is engaged, a slidable sleeve for effecting the engagement and disengagement of said clutch, free wheeling mechanism comprising means slidable along said shaft for actuating said sleeve in a direction to effect the disengagement of said clutch upon the overrunning of said shaft and for releasing said sleeve upon the overrunning of said driving member and manually operable means for adjusting the position of said mechanism for rendering the same operative at different degrees of overrunning by either said shaft or driving member.

8. In combination a clutch comprising a driving member and a driven member, a clutch shaft rotatable with said driven member, clutch arms for controlling the engagement of said driving and driven members, a slidable arm-operating sleeve rotatable about said shaft and operatively secured to said driving member for rotation therewith, a threaded member on said shaft rotatable therewith, a second sleeve slidably mounted on said shaft and threadedly engaging said threaded member, said second sleeve being provided with means for engaging said first sleeve for moving the same axially of said shaft, and friction means operatively connecting said first and second sleeves for causing said second sleeve to move along said threaded member and actuate said first sleeve axially in a direction to operate said clutch arms and release said driving and driven clutch members.

9. In a clutch, driving and driven members, clutch mechanism for connecting said members, manually releasable means for normally holding said clutch mechanism in engaged position, and means for automatically shifting said normally engaged clutch mechanism to disengaged position when the speed of the driven member exceeds that of the driving member, said last mentioned means comprising a sleeve mounted on and having a threaded connection with said driven member, whereby said sleeve is adapted when the speed of the driven member exceeds that of the driving member to travel longitudinally of said driven member and actuate said manually releasable clutch engaging means to release said clutch mechanism.

CHARLES R. KOURSH.